3,317,511
PREPARATION OF HYPOXANTHINE 1-N-OXIDE
AND ITS DERIVATIVES
Hideaki Kawashima, Takashi Meguro, and Izumi Kumashiro, Kanagawa-ken, and Tadao Takenishi, Tokyo, Japan, assignors to Ajinomoto Co., Inc., Tokyo, Japan
No Drawing. Filed Oct. 27, 1964, Ser. No. 406,881
Claims priority, application Japan, Oct. 29, 1963,
38/57,995; Feb. 19, 1964, 39/8,627
7 Claims. (Cl. 260—211.5)

The present invention relates to a method of preparing hypoxanthine 1-N-oxide and its derivatives.

We have found that adenine 1-N-oxide and its derivatives, such as adenosine 1-N-oxide are converted by reaction with nitrites to hypoxanthine 1-N-oxide and the corresponding derivatives, such as inosine 1-N-oxide, in very high yield. The reaction is represented by the formula

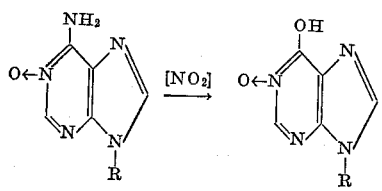

wherein R is hydrogen or ribofuranosyl with or without substituent, and $NO_2$ is nitrite.

Adenine 1-N-oxide and its derivatives, the starting materials of our method, may be prepared from adenine by oxidation with hydrogen peroxide in acetic acid solution (G. B. Brown et al.; J. Am. Chem. Soc., 80, 2755–2758 (1958)), or they may also be prepared by oxidation of adenine with monoperphthalate according to the method of F. Cramer et al. who have oxidized adenosine diphosphate with monoperphthalate (Biochim. Biophys. Acta, 72, 150–156 (1963)). In the present method, the adenine 1-N-oxide or its derivatives may be used in the form of pure crystals, of crude crystals recovered from reaction mixtures obtained in the afore-described methods, or the reaction mixtures themselves.

Nitrites which may be used in the present invention include nitrous acid; salts of the acid such as the water soluble sodium, potassium, or barium nitrites; and esters of nitrous acid such as methyl nitrite or ethyl nitrite. In the reaction of the present invention, salts and esters of nitrous acid are preferably used in the presence of acid, but the esters may also be employed without acid. The nitrite is generally employed in amounts of more than one mole per mole of adenine 1-N-oxide, and a 5 to 10 fold excess is preferred.

The reaction of the invention is generally carried out in a solvent. Suitable solvents include aliphatic lower alcohols, for example, methanol or ethanol; aliphatic lower ketones, for example, acetone or methylethylketone; lower alkanoic acids, such as acetic acid; other water soluble inert solvents, for example, N,N-dimethylformamide; water; and mixtures of such solvents. The reaction temperature may be chosen between about $-10°$ and about $50°$ C., and is preferably between $0°$ and $20°$ C. in the initial stages of the reaction. When the temperature is above $40°$ C. throughout the reaction period, the reaction mixture becomes colored, and the yield of the desired product is reduced. The pressure is not critical. The time required for the reaction varies with the reaction conditions, such as the method of introducing the nitrite into the reaction system, the amount of reactants, the solvent employed, and the reaction temperature, and may vary between a few hours and several days.

The end product may be isolated from the reaction mixture by conventional methods, for example, by filtration, and/or by evaporation of solvent. The crude crystals first obtained may be recrystallized from suitable solvents, such as water, methanol, ethanol, or mixtures thereof.

The process of the invention yields hypoxanthine 1-N-oxide, inosine 1-N-oxide, as well as other derivatives of hypoxanthine 1-N-oxide in yields of more than 80%.

The end products are readily identified by conventional methods, such as ultra-violet and infrared absorption spectrography, or paper chromatography.

Hypoxanthine 1-N-oxide and its derivatives are useful intermediates for the synthesis of purine nucleosides and purine nucleotides.

The following examples further illustrate the invention.

*Example 1*

5.0 grams adenine 1-N-oxide, which had been prepared from adenine by oxidation with hydrogen peroxide in acetic acid, were dissolved in a hot mixture of 100 ml. glacial acetic acid and 250 ml. water. After cooling, a solution of 23.0 g. sodium nitrite in 50 ml. water was added to the adenine-oxide solution at a temperature below $20°$ C., and the mixture was kept at room temperature for four days.

Pale yellow crystals precipitated, and were collected by filtration, washed with a small amount of water, and dried. The crude crystals weighed 4.5 g. (90%).

Only a single spot was detected on a paper chromatogram of the crystals in an n-propanol-conc. ammonia-water system (20:12:3 parts by volume), and in an n-butanol-acetic acid-water system (4:1:1).

The crude crystals were dissolved in 5 liters water and the solution was treated with active charcoal. The filtrate obtained after removal of the charcoal was partly evaporated. 3.5 grams of colorless crystals were obtained. The crystals began to change color when heated above $260°$ C., but substantial decomposition was not observed below $300°$ C. An elementary analysis of the crystals satisfied the expected formula $C_5H_4N_4O_2$.

Calculated for $C_5H_4N_4O_2$: C, 39.48%; H, 2.65%; N, 36.84%. Found: C, 39.60%; H, 2.96%; N, 37.27%.

The ultra-violet absorption spectrum of the crystals in 0.1 N-hydrochloric acid was in agreement with that published for hypoxanthine 1-N-oxide.

The $Rf$ value was 0.37 for an n-propanol system, and 0.40 for an n-butanol system.

An aqueous solution of the crystals was hydrogenated in the presence of platinum oxide at an initial hydrogen pressure of 10 kg./cm.$^2$ at $80°$ C. for 24 hours in an autoclave, and colorless crystals were obtained. The crystals were identified as hypoxanthine. An aqueous solution of the crystals became orange when mixed with aqueous ferric chloride solution.

Example 2

The procedure described in Example 1 was repeated with varying amounts of adenine 1-N-oxide and sodium nitrite, and with varying reaction times. The results obtained are listed below.

| Test No. | Reactants | | | Reaction time (days) | Hypoxanthine 1-N-oxide produced | |
|---|---|---|---|---|---|---|
| | Adenine-1-N-oxide (g.) | AcOH/H$_2$O (ml./ml.) | NaNO$_2$/H$_2$O (g./ml.) | | Grams | Yield (percent) |
| 1 | 2.0 | 120/24 | 4.2/45 | 5 | 1.2 | 60 |
| 2 | 1.0 | 30/24 | 4.6/10 | 2 | 0.9 | 90 |
| 3 | 1.0 | 10/70 | 4.6/10 | 4 | 1.0 | 100 |
| 4 | 1.0 | 30/20 | 0.9/3 | *4 | 0.4 | 40 |

*The reaction mixture was kept at 40° C. for one day and further at room temperature for 3 days. The reaction mixture turned brown.

NOTE.—AcOH is glacial acetic acid.

Example 3

5.0 grams of pure adenine - N-oxide were dissolved in 350 ml. of 30% acetic acid solution, and about 8 liters ethyl nitrite gas (about 16.7 mol equivalents of the adenine 1-N-oxide) were introduced into the solution while maintaining a temperature below 20° C. The mixture was held overnight at room temperature.

The precipitated pale yellow crystals were collected by filtration, washed with water, and dried. The crude crystals weighed 4.0 g. (80%). Only a single spot was detected on a paper chromatogram. The crude crystals were recrystallized from water, and 3.2 g. of colorless pure crystals were obtained.

Example 4

5.0 grams adenosine 1-N-oxide were dissolved in a mixture of 50 ml. glacial acetic acid and 100 ml. water, and a solution of 12.0 g. sodium nitrite in 25 ml. water was added at a temperature below 20° C. The reaction mixture was kept at room temperature for 2 days, and was then evaporated at an ambient temperature below 20° C. in a vacuum until pale yellow crystals formed. The crystals were separated from the mother liquor by filtration, washed with a small amount of ethanol, and dried.

The crude crystals were dissolved in water, the aqueous solution was passed through a column packed with a strongly acidic ion exchange resin of hydrogen ion type (Amberlite IR–120), and the column was then washed with water. The combined eluates were evaporated to dryness in a vacuum, and the residue was recrystallized from 90% ethanol to yield 4.0 g. inosine 1-N-oxide as colorless pure crystals (80%).

A single spot was detected on a paper chromatogram of the crystals in an n-propanol-conc. ammonia-water system (R$f$: 0.53) and in an n-butanol-acetic acid-water system (R$f$: 0.17). The crystals were discolored gradually above 200° C., and turned black at about 210° C. with decomposition.

An elementary analysis of the crystals agreed with the formula of inosine 1-N-oxide.

Calculated for C$_{10}$H$_{12}$N$_4$O$_6$: C, 42.25%; H, 4.26%; N, 19.71%. Found: C, 42.34%; H, 4.48%; N, 19.66%.

The ultra-violet absorption spectrum of the crystals showed $\lambda_{max.}$ 252 and 270 m$\mu$ (shoulder) at pH 1, and $\lambda_{max.}$ 228, 257 and 295 m$\mu$ at pH 13.

Absorption bands consistent with the expected structure were found in the infrared absorption spectrum of the crystals.

Example 5

6.0 grams 2′,3′-O-isopropylideneadenosine 1-N-oxide were dissolved in 350 ml. of 30% acetic acid, and about 8 liters ethyl nitrite were introduced into the solution at a temperature below 20° C. while the pH of the solution was maintained above 3.0 by addition of alkali. The reaction mixture was kept overnight at room temperature.

The pH of the reaction mixture was then adjusted to 7.0, and the solution was partly evaporated in a vacuum until a precipitate formed. It was filtered off and washed with ethanol. The dried pale yellow crystals obtained weighed 4.2 g. (70%).

Only a single spot was detected on a paper chromatogram in each solvent described in Example 1.

The crude crystals were recrystallized from water, and 4.0 g. of colorless pure crystals were obtained. An elementary analysis of the crystals satisfied the formula of 2′,3′-O-isopropylideneinosine 1-N-oxide.

Calculated for C$_{13}$H$_{16}$O$_6$N$_4$: C, 48.15%; H, 4.97%; N, 17.28%. Found: C, 48.32%, H, 5.03%; N, 17.15%.

Absorption bands consistent with the expected structure were found in the infrared absorption spectrum of the crystals.

100 Mg. of the crystals were treated with aqueous N HCl in a boiling water bath and 20 mg. of colorless crystals were obtained by vacuum evaporation of the reaction mixture, and recrystallization of the residue from water. The infrared absorption bands of the crystals agreed with those of hypoxanthine 1-N-oxide.

While the invention has been described with particular reference to specific embodiments, it is to be understood that it is not limited thereto, but is to be construed broadly, and restricted solely by the scope of the appended claims.

What we claim is:

1. A compound of the formula:

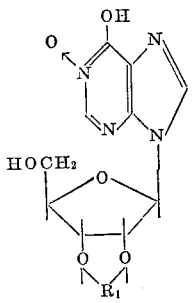

wherein R$_1$ is a member of the group consisting of two hydrogen atoms and lower alkylidene.

2. Inosine 1-N-oxide.
3. 2′,3′-O-isopropyl ideneinosine 1-N-oxide.
4. A method of producing a purine derivative, which comprises reacting a compound of the formula

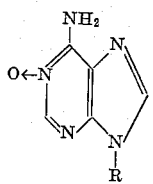

wherein R is a member of the group consisting of hydrogen, furanosyl, and 2′,3′-O-isopropylidene-furanosyl, with nitrite.

5. A method as set forth in claim 4, wherein said nitrite is a member selected from the group consisting of nitrous acid, water soluble salts of nitrous acid, and lower alkyl esters of nitrous acid.

6. A method as set forth in claim 5, wherein said second compound is reacted with said nitrite in a liquid medium soluble in water and inert to said nitrite and said second compound at a temperature between −10° C. and 50° C.

7. A method as set forth in claim 6, wherein said medium is aqueous and inert to said compounds.

References Cited by the Examiner
UNITED STATES PATENTS

| | | | |
|---|---|---|---|
| 2,719,843 | 10/1955 | Davoll et al. | 260—211.5 |
| 3,167,540 | 1/1965 | Pike et al. | 260—211.5 |
| 3,180,859 | 4/1965 | Hoeksema | 260—211.5 |

ELBERT L. ROBERTS, *Primary Examiner.*
JOHNNIE R. BROWN, *Assistant Examiner.*